Inventor:
OTTO HAUSINGER

United States Patent Office 3,533,301
Patented Oct. 13, 1970

3,533,301
TRANSMISSION SHIFTING MECHANISM INCLUDING LOCKING MEANS FOR PREVENTING OVER-SHIFTING
Otto Hausinger, Gerlingen, Germany, assignor to Dr.-Ing. h.c.F. Porsche KG, Stuttgart-Zuffenhausen, Germany
Filed Mar. 28, 1969, Ser. No. 811,454
Claims priority, application Germany, Mar. 28, 1968, 1,750,088
Int. Cl. G05g 9/18
U.S. Cl. 74—475   7 Claims

ABSTRACT OF THE DISCLOSURE

A shifting mechanism for multi-stage change-speed transmissions, incorporating a locking device serving to limit preselection movement of the gearshift lever shaft, including a cam, mounted on the shaft for axial displacement relative thereto and rotation therewith, effected by an axially-extending key, a locking segment attached to the transmission housing and positioned so as to engage selectively with a stop lug of said cam, two compression springs disposed on opposite sides of the stop lug and sleeves supporting each spring and serving as an entrainment member to axially shift the cam upon axial displacement of the shaft.

BACKGROUND OF THE INVENTION

The present invention relates to a shifting mechanism for multi-stage change-speed transmissions, particularly for transmissions employed in automotive vehicles having five forward speeds, wherein the shifting linkage is provided with a locking device which effectively limits the permissible preselection movement of the gearshift lever shaft.

In order to preclude erroneous shifting of multi-stage change-speed transmissions, it has been known heretofore to provide resiliently elastic abutment members to maintain the gearshift lever in a central track of three shifting tracks in the starting position. By appropriately staggering the positions of the springs or the like, it is intended that the driver will have sufficient indication of the particular shifting position which has been accomplished. Such arrangements, however, do not effectively prevent erroneous over-shifting, for example, from a high-speed gear into a starting or reverse gear, since the effectiveness of such devices depend entirely upon the individual driver's sensitivity as to whether the intermediate resistance points are sufficiently noticeable.

Similarly ineffective arrangements have been known wherein the gear-shift lever engages a shifting plate which is so constructed as to produce, in conjunction with resilient abutments, perceptible resistance at particular points during gear preselection.

Accordingly, it is an object of the present invention to provide a shifting device for multi-stage change-speed transmissions wherein the shifting linkage includes an effective locking unit precluding erroneous shifting.

Further, it is an object of the present invention to provide a shifting mechanism of the type described above wherein the linkage incorporates a locking unit preventing a driver from shifting, in a single stage, over a range of more than one speed.

Further, it is an object of the present invention to provide a shifting mechanism of the type described above which is relatively simple and inexpensive to produce.

Finally, it is an object of the present invention to provide a shifting mechanism which effectively precludes shifting from an outer shifting track of a conventional H-system to the opposite outer shifting track except by shifting through the central shifting track.

SUMMARY OF THE INVENTION

The foregoing objects are accomplished, in accordance with the present invention, by providing a locking unit including a cam member mounted upon the gearshift lever shaft for axial displacement relative thereto and rotation therewith, a locking segment attached to the transmission housing and disposed so as to selectively engage with a stop lug of the cam. The cam is maintained in a neutral position between two compression springs, having an equal spring force, disposed on opposite sides of the stop lug. A sleeve is provided for each of the springs, cooperating with a respective part secured to the gearshift lever shaft, for supporting the compression springs and simultaneously serving as an entrainment member to cause axial displacement of the cam upon displacement of the gearshift lever shaft.

This construction, described in detail hereinbelow, provides for displacement of the cam along the gearshift lever shaft under the influence of one of the two compression springs and also affords a simple resilient guidance of the compsession springs on the cam.

The locking segment includes a profiled strip disposed so as to selectively engage with the stop lug of the cam and is preferably secured at the transmission housing. In this manner, a simple though effective lock is obtained, resulting in an efficient assembly and adjustment of the entire shifting mechanism. Accordingly, the maufacturing and assembly expenses involved in the production of the novel shifting mechanism contemplated by the present invention are minimized.

BRIEF DESCRIPTION OF THE DRAWINGS

The foregoing objects, features and advantages of the present invention will become more apparent from a consideration of the detailed description hereinbelow when considered in conjunction with the accompanying drawings, wherein.

DETAILED DESCRIPTION OF THE DRAWINGS

Figure 1:
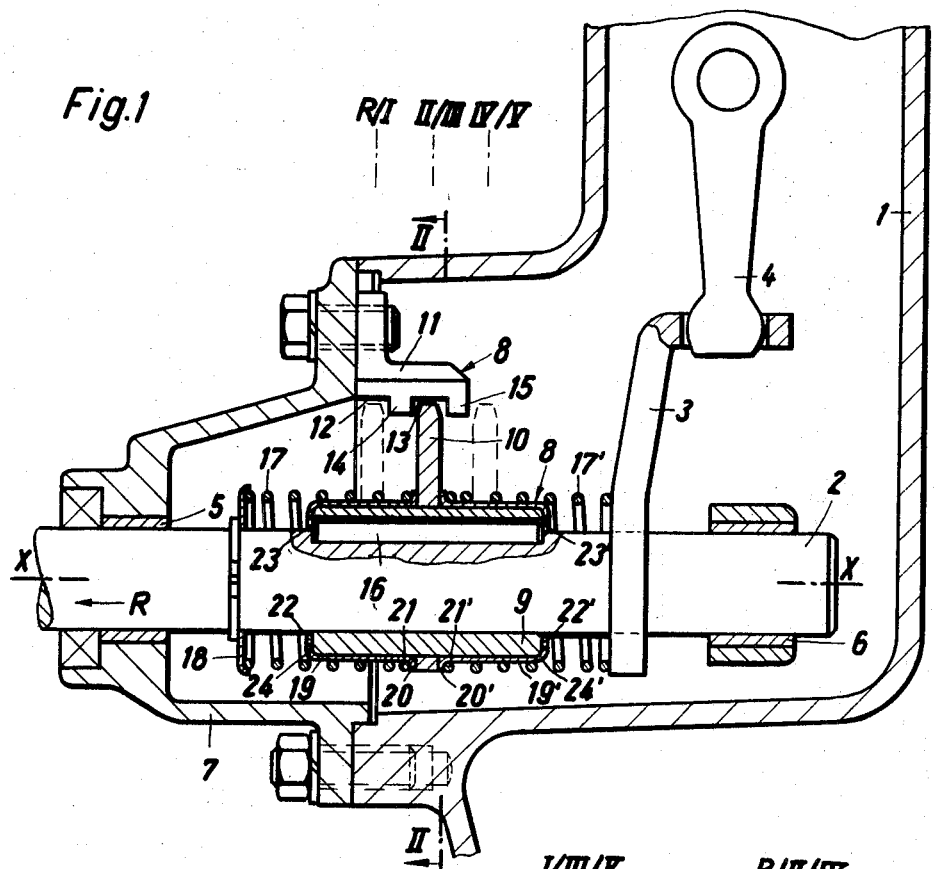
FIG. 1 represents a longitudinal section through the shifting mechanism, constructed in accordance with the present inventiton, for a five-speed transmission of an automotive vehicle.

A gearshift lever shaft 2 is disposed within a transmission housing 1 of a five-speed transmission in a rotatable and axially-displaceable manner. At one end (on the left-hand side, as viewed in FIG. 1), the gearshift lever shaft 2 is appropriately connected with the manual gearshift lever (not shown). In order to effect selection of the desired gears, the gearshift lever shaft 2 is displaced in the axial direction thereof and rotated about its longitudinal axis X—X.

A transmission lever 3, disposed at the other end of the gearshift lever shaft 2, is pivotably connected with an intermediate lever 4. The intermediate lever 4 transmits the rotational and translational motions of the gearshift lever shaft 2 to a shift finger (not shown), which latter member can be operatively connected, in a conventional manner, with the individual shifting rods of the change-speed transmission.

A locking unit 8 is disposed between the shaft bearings 5 and 6 in the transmission housing 1 and in the bearing cover 7. The locking unit 8 includes a cam 9 with a centrally-disposed stop lug 10 secured thereto. Stop lug 10 is arranged to cooperate, in a selective manner, with a profiled strip 11, secured to bearing cover 7.

The profiled strip 11 includes grooves 12 and 13 and projections 14 and 15, which serve to guide stop lug 10 of cam 9.

The cam 9 is secured to the gearshift lever shaft 2 for rotation together therewith, while allowing for axial displacement therebetween, by means of a key 16 secured within shaft 2. Cam 9 and, accordingly, stop lug 10 secured thereto are resiliently supported by two compression springs 17 and 17', disposed on opposite sides of stop lug 10. The compression springs 17 and 17' abut, at their respective outer ends, against transmission lever 3 and spring washer 18, each of which is secured to gearshift lever shaft 2. Sleeves 19 and 19' are provided for guiding the respective compression springs 17 and 17'. The sleeves 19 and 19' each incorporate a flanged rim 20 and 20' on the respective side thereof associated with the stop lug 10 for the purpose of supporting the respective inner ends 21 and 21' of the compression springs 17 and 17'. The outer ends 23 and 23' of the sleeves 19 and 19', which are associated, respectively, with the front surfaces 22 and 22' of cam 9 include turned-in flange portions 24 and 24', which engage gearshift lever shaft 2 by virtue of their interference with key 16, thereby serving as entrainment members for sleeves 19 and 19' and cam 9 for axial displacement with shaft 2.

The operation of the shifting mechanism represented in the drawings can be better understood by focusing upon the manner in which gear preselection is limited by the novel apparatus. Thus, in the idling position of the gearshift lever shaft 2, the stop lug 10 of cam 9 is disposed within groove 13 of the profiled strip 11, as illustrated in FIG. 1. When selecting the first gear, the gearshift lever shaft 2 is displaced in the direction of arrow R. The displacement of the shaft 2 and, accordingly, key 16, in the direction of arrow R causes sleeve 19 and, correspondingly, spring 17 to be similarly displaced. Thus, flanged rim 20 of sleeve 19 is moved slightly away from stop lug 10 (to the left, as viewed in FIG. 1). Under these circumstances, the force of spring 17', unopposed by the force of spring 17, urges stop lug 10 to move to the left, as viewed in FIG. 1, until it abuts projection 14 of profiled strip 11. It should be noted in passing that the bias of compression spring 17 remains unchanged as it is shifted to the left, as viewed in FIG. 1, together with the shaft 2. At this point, cam 9 is urged, by the force of compression spring 17' acting on stop lug 10, against projection 14 of profiled strip 11.

Figure 2:
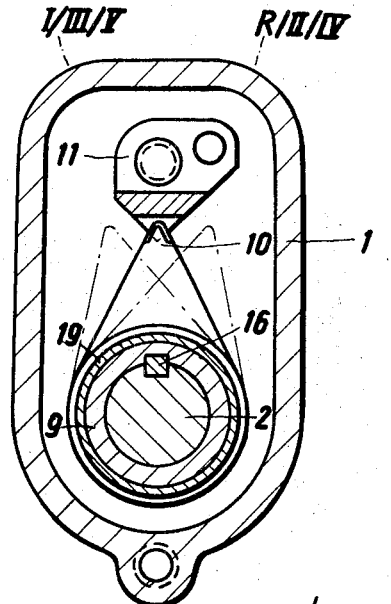
FIG. 2 represents a cross-section along line II—II of FIG. 1.

To effect a shifting into first gear, the gear shift lever shaft 2 is pivoted about axis X—X in the selection position described immediately above. The rotation of shaft 2 about axis X—X causes stop lug 10 attached to cam 9 to be pivoted out of groove 13 (as seen in FIG. 2) and axially displaced, by the force of compression spring 17', to a point corresponding with groove 12 and, accordingly, either first gear or reverse gear of the profiled strip 11 (indicated as R/I). As seen in FIG. 2, the gear selected depends upon the direction of rotation of shaft 2 and stop lug 10.

The shifting process for effecting a shifting from the initial or neutral position in the plane of gears II/III into the plane of gears IV/V is accomplished in an analogous manner to the shifting process described immediately above, with the counterparts of the various components assuming the functions served by the corresponding components, as set forth above.

When the fifth gear is engaged, the stop lug 10 of cam 9 is positioned, as represented in FIG. 2 in dot-dash lines, pivotably displaced in advance of projection 15 of profiled strip 11. As the fifth gear is disengaged, the gear-shift lever shaft 2 is first pivoted about axis X—X together with cam 9 and stop lug 10 so that stop lug 10 abuts projection 15 of profiled strip 11. If gearshift lever shaft 2 is then displaced in the direction of arrow R, stop lug 10 is immobilized by virtue of its contact with projection 15. Thus, it can be seen that a displacement of gearshift lever shaft 2 is possible only to the extent of the plane of gears II/III. In the event that gearshift lever shaft 2 is displaced further in the direction of arrow R, then the front surface 22' of sleeve 19' or of cam 9 abuts lever 3, thus positively preventing further displacement of cam 9 in the direction of arrow R. Additionally, stop lug 10 abuts projection 15 of profiled strip 11, rendering further displacement of gearshift lever shaft 2 in the direction of the plane of gears R/I impossible. Similarly, an over-shifting from plane R/I to plane IV/V is also precluded.

While the present invention has been disclosed with reference to a specific embodiment thereof, it is to be clearly understood that the scope of the invention is not limited to the specific details thereof, but is susceptible of numerous changes and modifications as would be obvious to one with normal skill in the pertinent technology. Thus, it is entirely conceivable that the present invention is applicable not only to the illustrated indirect shifting device, but also for transmissions wherein the manual gearshift lever directly engages the gearshift shafts of the transmission.

What is claimed is:

1. A shifting mechanism for multi-stage change-speed transmissions, particularly for automotive vehicle transmissions having five forward gears, comprising:

gearshift lever shaft means arranged within a transmission housing and capable of rotation and axial displacement, cam means supported upon said shaft means for rotation together therewith, but capable of axial displacement relative thereto, said cam means including stop lug means projecting therefrom, locking segment means secured at a fixed transmission part and adapted for selective engagement with said stop lug means, oppositely-biased elastic means disposed on opposite sides of said stop lug means to retain same in a neutral position in a corresponding position of said shaft means, entrainment means associated with said shaft means and each of said elastic means and operative to relieve the resilient bias from one side of said stop lug means in response to an axial displacement of said shaft means in the direction of said one side, and said elastic means including abutment means fixed with respect to axial displacement of said shaft and disposed on opposite sides of said stop lug means, thus serving to limit the possible extent of axial displacement of said stop lug means in a single stage, whereby erroneous shifting by a driver is effectively precluded.

2. A shifting mechanism according to claim 1, wherein said locking segment means includes a profiled strip having projections spaced apart in the axial direction of said shaft means which serve, selectively, as abutment members for said stop lug means in the axial direction of said shaft means when said stop lug means are angularly-oriented, relative to said shaft means, in a predetermined manner.

3. A shifting mechanism according to claim 2, further comprising axially-extending key means secured to said shaft means and extending into sliding engagement with a corresponding, axially-extending keyway provided in said cam means.

4. A shifting mechanism according to claim 3, wherein said entrainment means includes two sleeve means, each of which is operatively connected with a respective elastic means, each of said sleeve means including a first flange means at one end thereof, disposed so as to engage with said stop lug means and a second flange means, at the opposite end thereof, disposed so as to engage with said key means.

5. A shifting mechanism according to claim 4, wherein said elastic means includes two compression springs each of which is supported, at one end thereof, by a respective one of said abutment means and, at the opposite end thereof, by said first flange means of a respective sleeve means.

6. A shifting mechanism according to claim 5, wherein one of said abutment means includes one end of a transmission lever, the opposite end of which is adapted to be connected with individual shifting rods of the transmission.

7. A shifting mechanism according to claim 6, wherein the other of said abutment means includes a spring washer secured to said shaft means for axial displacement together therewith.

References Cited

UNITED STATES PATENTS

| 1,463,328 | 7/1923 | Lewis | 74—477 |
| 1,946,750 | 2/1934 | Matthews | 74—477 |

MILTON KAUFMAN, Primary Examiner

U.S. Cl. X.R.

74—476